United States Patent
Halik et al.

(10) Patent No.: US 12,484,476 B2
(45) Date of Patent: Dec. 2, 2025

(54) DECK MOUNTABLE STRING TRIMMER ATTACHMENT ASSEMBLY

(71) Applicant: Trimyxs, LLC, Fargo, ND (US)

(72) Inventors: Aaron Halik, Moorhead, MN (US); Carter Daly, Eagle Lake, MN (US); Ryan Luthi, Fargo, ND (US); Benjamin Kehborn, Fridley, MN (US)

(73) Assignee: Trimyxs, LLC, Fargo, ND (US)

( * ) Notice: Subject to any disclaimer, the term of this patent is extended or adjusted under 35 U.S.C. 154(b) by 0 days.

(21) Appl. No.: 19/034,432

(22) Filed: Jan. 22, 2025

(65) Prior Publication Data

US 2025/0169394 A1    May 29, 2025

Related U.S. Application Data

(63) Continuation-in-part of application No. 17/682,344, filed on Feb. 28, 2022.

(60) Provisional application No. 63/159,373, filed on Mar. 10, 2021.

(51) Int. Cl.
*A01D 34/416* (2006.01)
*A01D 101/00* (2006.01)

(52) U.S. Cl.
CPC ...... *A01D 34/4165* (2013.01); *A01D 34/4167* (2013.01); *A01D 2101/00* (2013.01)

(58) Field of Classification Search
CPC ............ A01D 34/4165; A01D 34/4167; A01D 34/001; A01D 34/84; A01D 43/16
See application file for complete search history.

(56) References Cited

U.S. PATENT DOCUMENTS

| | | | |
|---|---|---|---|
| 4,663,920 A * | 5/1987 | Skovhoj | A01B 45/00 56/14.7 |
| 4,718,221 A | 1/1988 | Wessel et al. | |
| 4,854,115 A | 8/1989 | Jones et al. | |
| 4,949,536 A * | 8/1990 | Neufeld | A01D 43/16 56/16.9 |
| 5,966,914 A | 10/1999 | Reents | |
| 6,094,896 A | 8/2000 | Lane | |
| 6,434,920 B1 | 8/2002 | Keane | |
| 6,986,238 B1 * | 1/2006 | Bloodworth | A01D 34/84 56/17.6 |
| 7,165,383 B1 | 1/2007 | Luton, Jr. | |
| 8,046,980 B1 | 11/2011 | Schroeck | |
| 8,322,121 B1 * | 12/2012 | Marcell | A01D 34/84 56/13.6 |
| 8,464,504 B1 | 6/2013 | Huff | |
| 9,386,740 B2 | 7/2016 | Miller | |
| 9,510,506 B2 | 12/2016 | Castelli et al. | |
| 10,660,269 B2 | 5/2020 | Pendleton | |
| 11,950,531 B1 | 4/2024 | Patrick et al. | |

(Continued)

*Primary Examiner* — Joseph M Rocca
*Assistant Examiner* — Robert E Pezzuto
(74) *Attorney, Agent, or Firm* — Fargo Patent & Business Law; Thomas Kading; Joshua Krank

(57) ABSTRACT

A string trimmer attachment assembly for a lawn mower includes a deck attachment mount; a turret mounted to the deck attachment mount about an axis; a trimmer head; a first arm mountable to the turret, the first arm adjustable along a first axis; a second arm mountable to the trimmer head, the second arm adjustable along a second axis; and a coupling to connect the first arm and the second arm such that the second arm is transverse to the first arm.

17 Claims, 12 Drawing Sheets

(56) References Cited

U.S. PATENT DOCUMENTS

2010/0326031 A1    12/2010  Branden
2018/0077861 A1*   3/2018  Lego .................. A01D 34/4165

\* cited by examiner

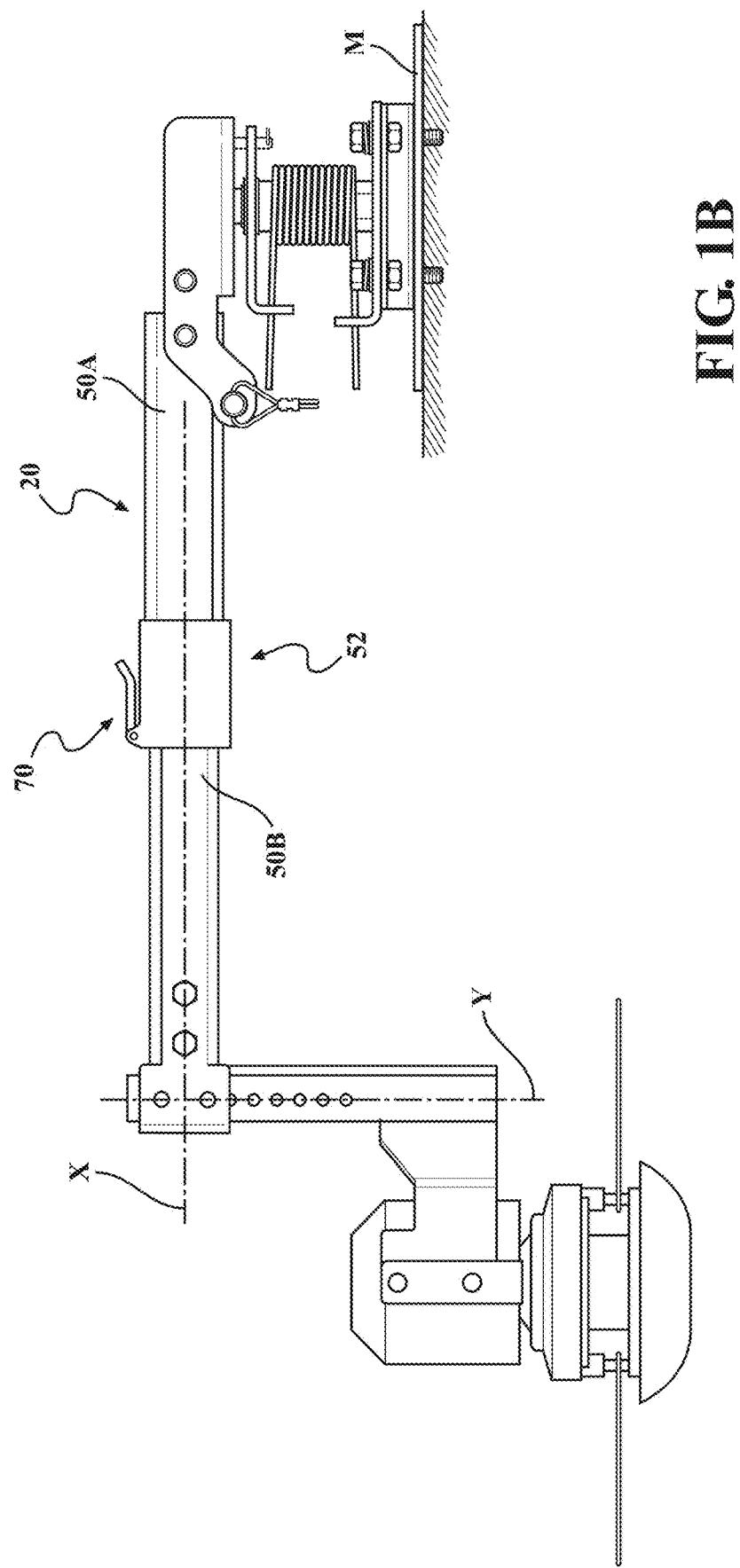

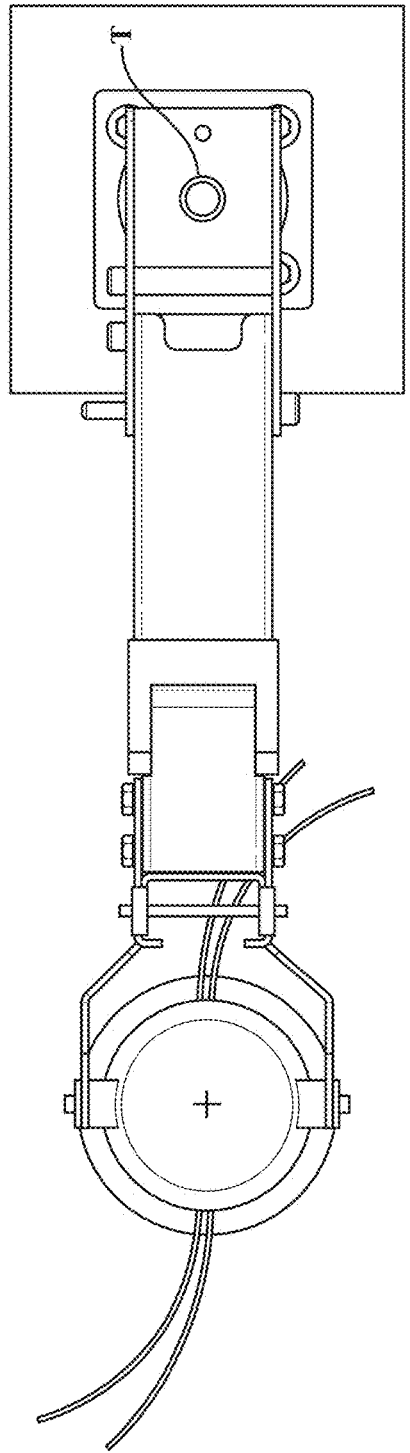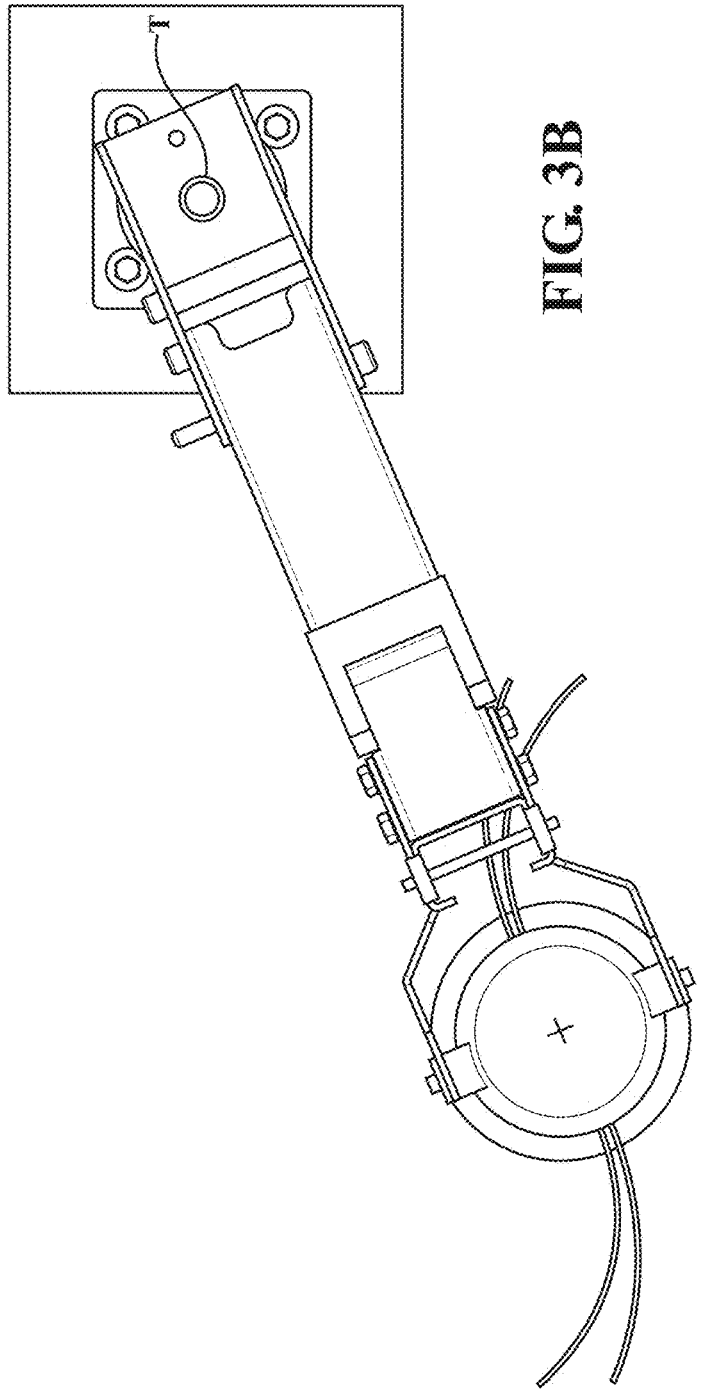
FIG. 3A
FIG. 3B

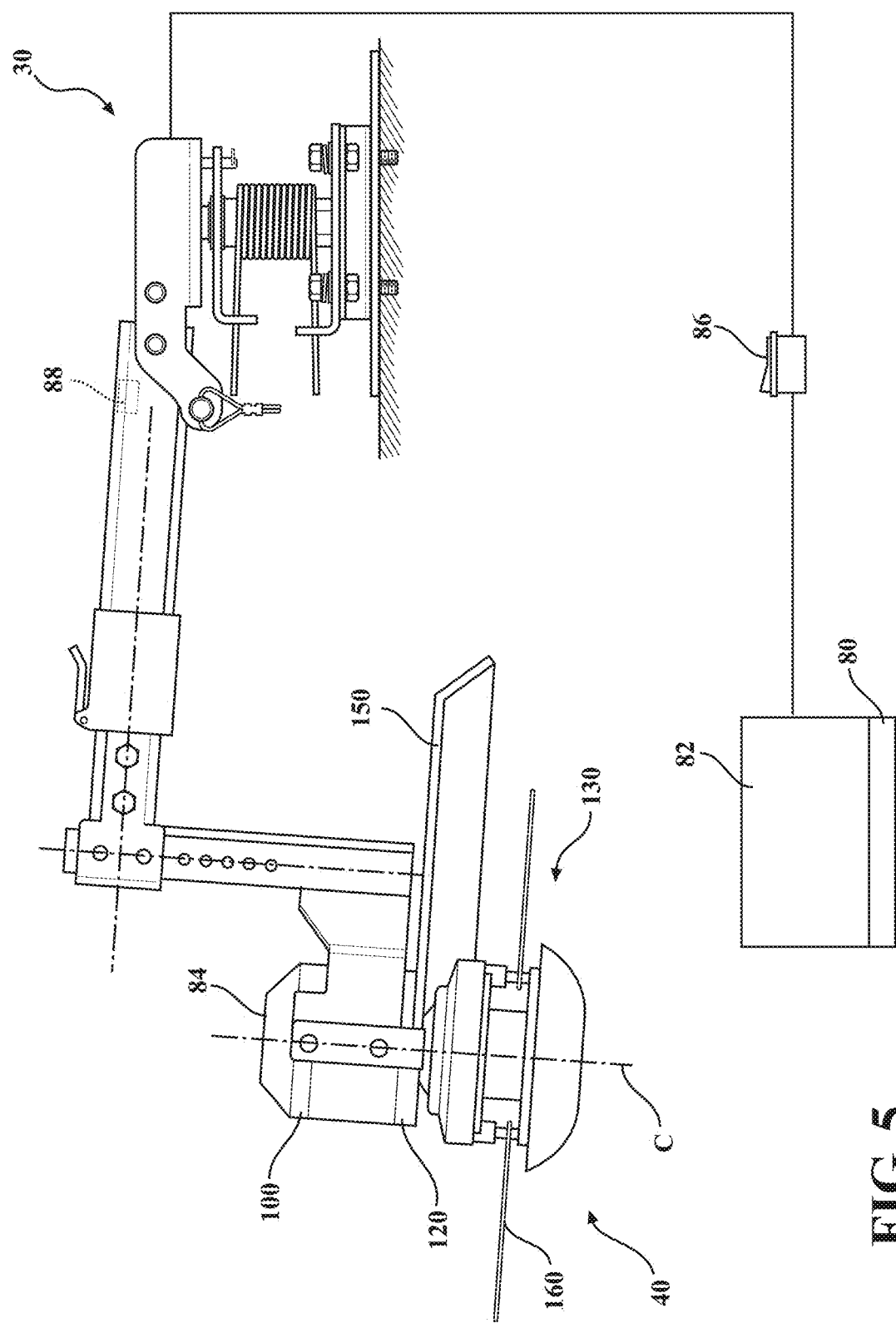

DECK MOUNTABLE STRING TRIMMER ATTACHMENT ASSEMBLY

CROSS REFERENCE TO RELATED APPLICATION[S]

This application claims the priority as a continuation-in-part of U.S. Nonprovisional patent application Ser. No. 17/682,344 (01526-HAL) filed Feb. 28, 2022 which claims priority to U.S. Provisional Patent Application 63/159,373 (01367-HAL) filed Mar. 10, 2021. Each of the aforementioned patent applications, and any applications related thereto, are herein incorporated by reference in their entirety.

BACKGROUND

The present disclosure relates to a string trimmer for lawn maintenance and more specifically to a string trimmer attachment assembly which is mountable to a lawn mower.

Lawn maintenance often includes mowing grass using a lawn mower as well as trimming grass in areas which may not be fully accessed by the lawn mower. Trimmers are used along fences, around trees, near edging, and many other areas. Typically, weekly lawn care activities consist of two tasks, trimming and mowing. On average, an operator will spend about a minute trimming for every two minutes mowing.

Handheld string trimmers typically have a string like mechanical feature which is quickly rotated to cut weeds and grass. Fine adjustments and not a little dexterity may be needed to position a trimmer such that the weeds and grass are properly cut to a desired length. Although trimming is a meticulous task, it may also pose certain hazards.

SUMMARY

A string trimmer attachment assembly for a lawn mower according to one disclosed non-limiting embodiment of the present disclosure includes a deck attachment mount; a turret mounted to the deck attachment mount about an axis; a trimmer head; a first arm mountable to the turret, the first arm adjustable along a first axis; a second arm mountable to the trimmer head, the second arm adjustable along a second axis; and a coupling to connect the first arm and the second arm such that the second arm is transverse to the first arm.

A further embodiment of any of the foregoing embodiments of the present disclosure includes that the deck attachment mount comprises a first plate fastened to a deck of a lawn mower, and a second plate attached to the turret.

A further embodiment of any of the foregoing embodiments of the present disclosure includes that the first axis is perpendicular to the second axis.

A further embodiment of any of the foregoing embodiments of the present disclosure includes that the first arm and the second arm are rectilinear in cross-section.

A further embodiment of any of the foregoing embodiments of the present disclosure includes that the coupling is located at an interface between the first arm and the second arm.

A further embodiment of any of the foregoing embodiments of the present disclosure includes that the first arm is positionable in azimuth and elevation.

A further embodiment of any of the foregoing embodiments of the present disclosure includes that the first arm is positionable in azimuth to any of a multiple of positions about an axis defined by the turret.

A further embodiment of any of the foregoing embodiments of the present disclosure includes that the first arm is spring biased with respect to the selected one of the multiple of positions.

A further embodiment of any of the foregoing embodiments of the present disclosure includes that the first arm is positionable in elevation about an axis defined by the turret.

A further embodiment of any of the foregoing embodiments of the present disclosure includes that the first arm is movable in elevation between a lower stop and an upper stop defined by the turret.

A further embodiment of any of the foregoing embodiments of the present disclosure includes that the first arm is spring biased in elevation toward the lower stop.

A further embodiment of any of the foregoing embodiments of the present disclosure includes a limit switch mounted to the first arm, the trimmer head deactivated in response to the first arm being positioned at the upper stop.

A turret for a string trimmer attachment assembly according to one disclosed non-limiting embodiment of the present disclosure includes a support pin that defines an axis; a lower turret plate fastened to the support pin; a middle turret plate rotationally mounted to the support pin, the middle turret plate comprises a multiple of apertures located at least partially around the axis; an upper turret plate rotationally mounted to the support pin; a pin that extends through the upper turret plate and one of the multiple of apertures in the middle turret plate; and a torsion spring about the support pin, the torsion spring engaged with the middle turret plate and the lower turret plate to spring bias the upper turret plate in azimuth with respect to the lower turret plate.

A further embodiment of any of the foregoing embodiments of the present disclosure includes a first arm pivotally mounted to the upper turret plate such that the first arm is positionable in elevation about an axis.

A further embodiment of any of the foregoing embodiments of the present disclosure includes that the first arm is movable in elevation between a lower stop and an upper stop defined by the upper turret plate.

A further embodiment of any of the foregoing embodiments of the present disclosure includes that the first arm is spring biased in elevation toward the lower stop.

A further embodiment of any of the foregoing embodiments of the present disclosure includes a limit switch mounted to the first arm, a trimmer head deactivated in response to the first arm being positioned at the upper stop.

A further embodiment of any of the foregoing embodiments of the present disclosure includes a deck mount plate mountable to a mower deck, lower turret plate removably fastenable to the deck mount plate.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 1B is a side view of a string trimmer attachment assembly for attachment to a mower deck in a second horizontally adjusted position.

FIG. 3A is a side view of a string trimmer attachment assembly for attachment to a mower deck in a first azimuthally adjusted position.

FIG. 3B is a side view of a string trimmer attachment assembly for attachment to a mower deck in a second azimuthally adjusted position.

FIG. 5 is a schematic view of an electrical system of the string trimmer attachment assembly.

DETAILED DESCRIPTION

Figure 1A:
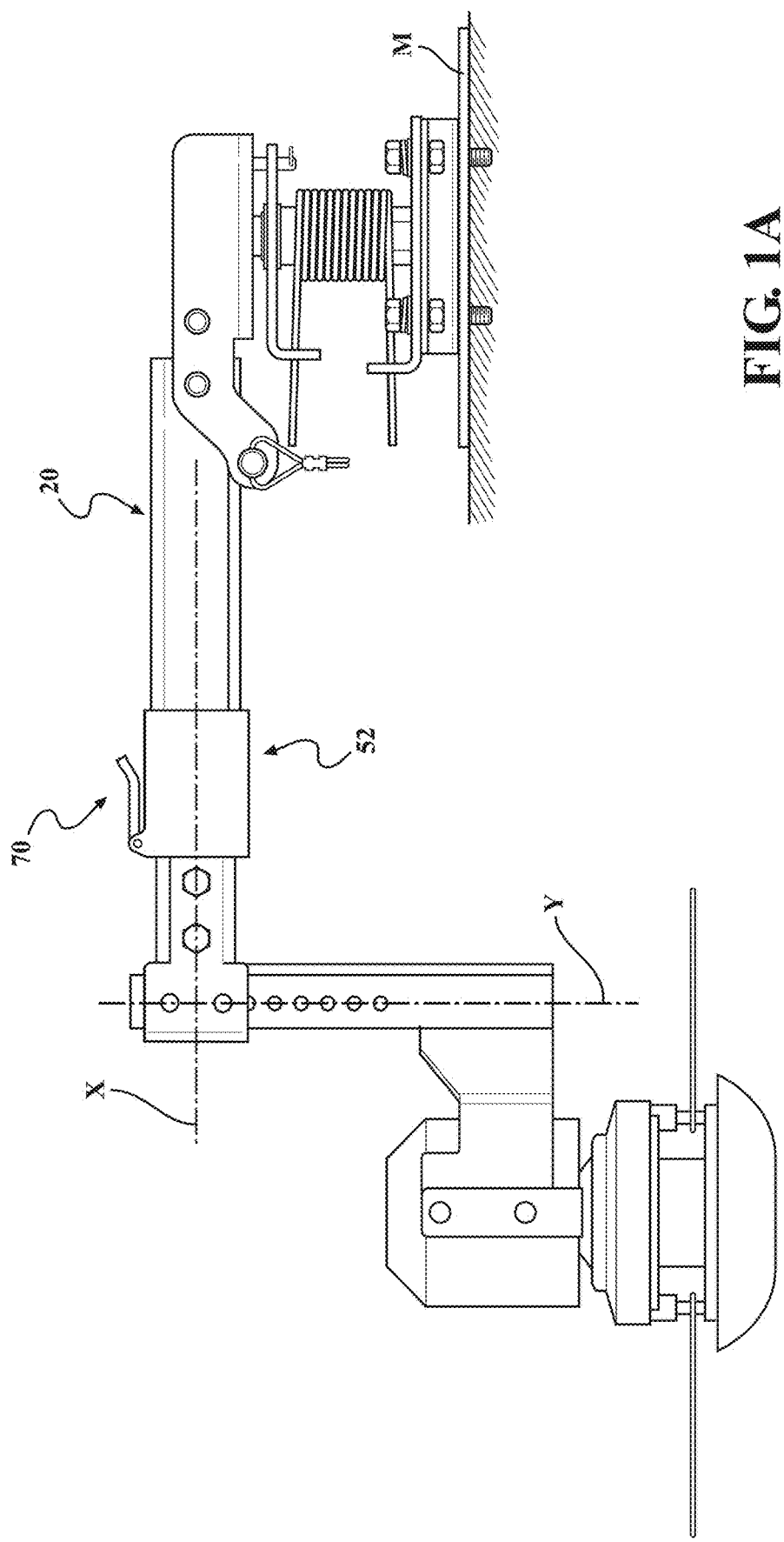
FIG. 1A is a side view of a string trimmer attachment assembly for attachment to a mower deck in a first horizontally adjusted position.

FIG. 1A, 1B, 2A, 2B, 3A, 3B, 4A, 4B schematically illustrates a string trimmer attachment assembly 20 for attachment to a top surface of a mower deck M. Mower deck M may be the mower deck of a riding lawn mower. The string trimmer attachment assembly 20 may be used in either a retrofit application or may be installed on mower decks during original manufacture. Although described with respect to the mowing deck of a lawn mower, the string trimmer attachment assembly 20 disclosed herein may be attached to other parts and/or components of various types of lawn mowers, push mowers, and other equipment.

The string trimmer attachment assembly 20 generally includes a base 30, a trimmer head 40, a first arm 50, a second arm 60, and a coupling 70. The trimmer head 40 is horizontally (FIGS. 1A and 1B) and vertically (FIGS. 2A and 2B) adjustable with respect to the base 30 such that the trimmer head 40 may be positioned with respect to the mower deck M. The trimmer head 40 is also biased in azimuth (FIGS. 3A and 3B) and elevation (FIGS. 4A and 4B) with respect to the base 30 to absorb impacts as well as follow a ground contour.

In one embodiment, the trimmer head 40 is electrically powered, however other trimmers such as internal combustion power may be provided. In this embodiment, a battery mount 80 to receive a battery 82, a controller 84, an on/off switch 86, and a limit switch 88 may be located remotely from the trimmer head 40 (FIG. 5) but facilitate operation thereof. The battery mount 80, the battery 82, and/or the on/off switch 86 may be wired from the trimmer head 40 thence through the base 30 with an extension to allow placement in a remote location as desired, for example, near where the user may operate the mower.

The controller 84 may include at least one processor, e.g., microprocessor, microcontroller, digital signal processor, etc., a memory, and an input/output (I/O) interface. The processor and the I/O interface are communicatively coupled to the memory. The memory may be embodied as various forms of ROM, RAM, which stores data and control algorithms such as the logic described herein to control, for example, the trimmer head 40. The I/O interface is communicatively coupled to a number of hardware, firmware, and/or software components, including, for example, the on/off switch 86 and the limit switch 88 to, for example, shut down the trimmer head 40 in response to a position of the limit switch 88.

The trimmer head 40 may include an electric motor 100, a gear system 120, a trimmer head 130, and a trimmer guard 150. The motor 100 is operable in response to the controller 84. The motor 100 drives the trimmer head 130 from which a cutter 160 extends either directly or through the gear system 120. Various gear systems and drive arrangements may be provided. The cutter 160 may include a line, blades, or other such device that cuts the grass and weeds as the trimmer head 130 is rotated about axis C by the motor 100. The trimmer guard 150 may be a sizable guard that at least partially encircles the cutter 160 to prevent the discharge of debris.

With continued reference to FIG. 1A, 1B, 2A, 2B, the first arm 50 is adjustable along a first axis A to provide horizontal adjustment (FIGS. 1A and 1B) and the second arm 60 is adjustable along a second axis Y to provide vertical adjustment (FIGS. 2A and 2B) with respect to the base 30. In this embodiment, the first axis X is perpendicular to the second axis Y.

Figure 2A:
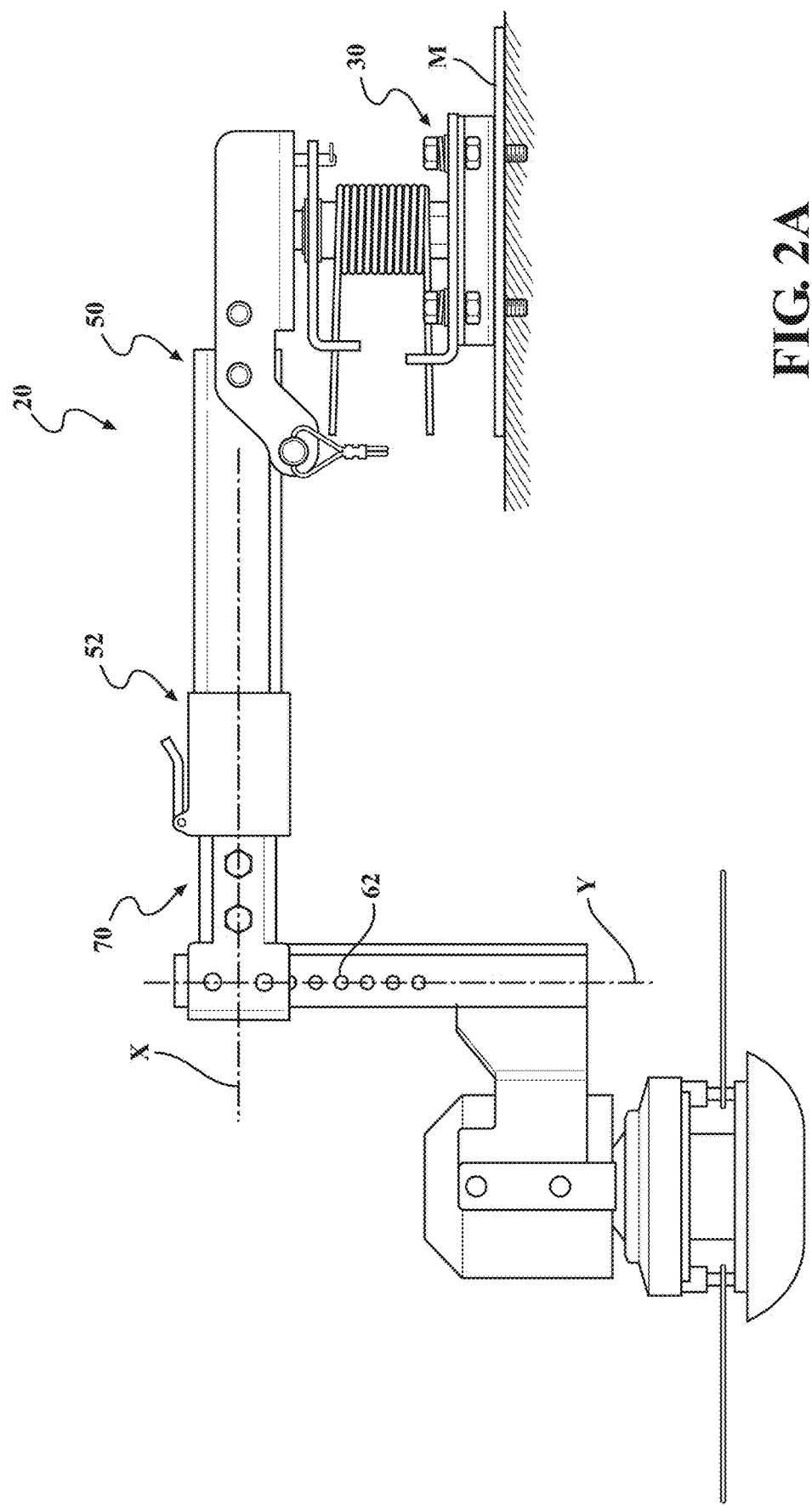
FIG. 2A is a side view of a string trimmer attachment assembly for attachment to a mower deck in a first vertically adjusted position.
Figure 2B:
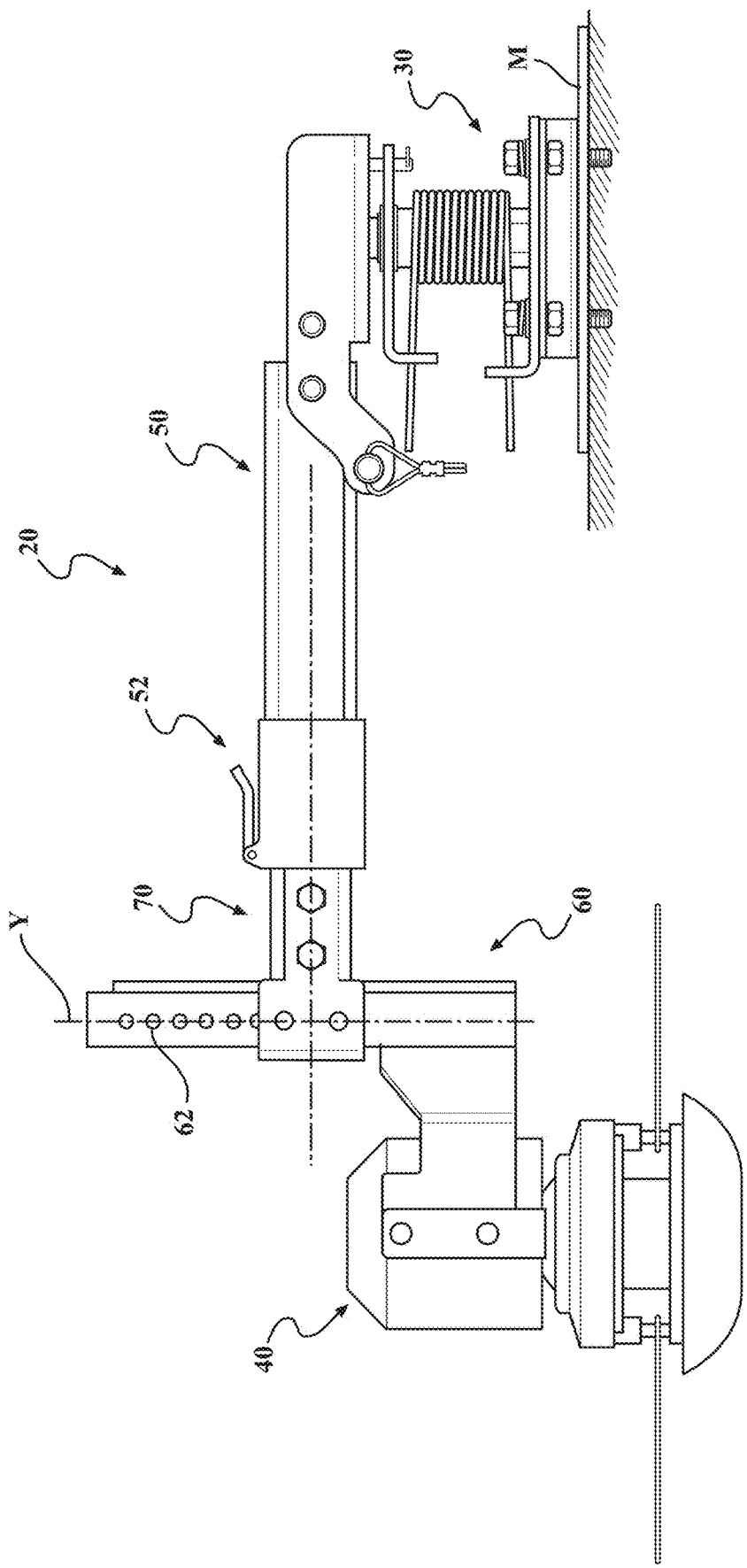
FIG. 2B is a side view of a string trimmer attachment assembly for attachment to a mower deck in a second vertically adjusted position.
Figure 4A:
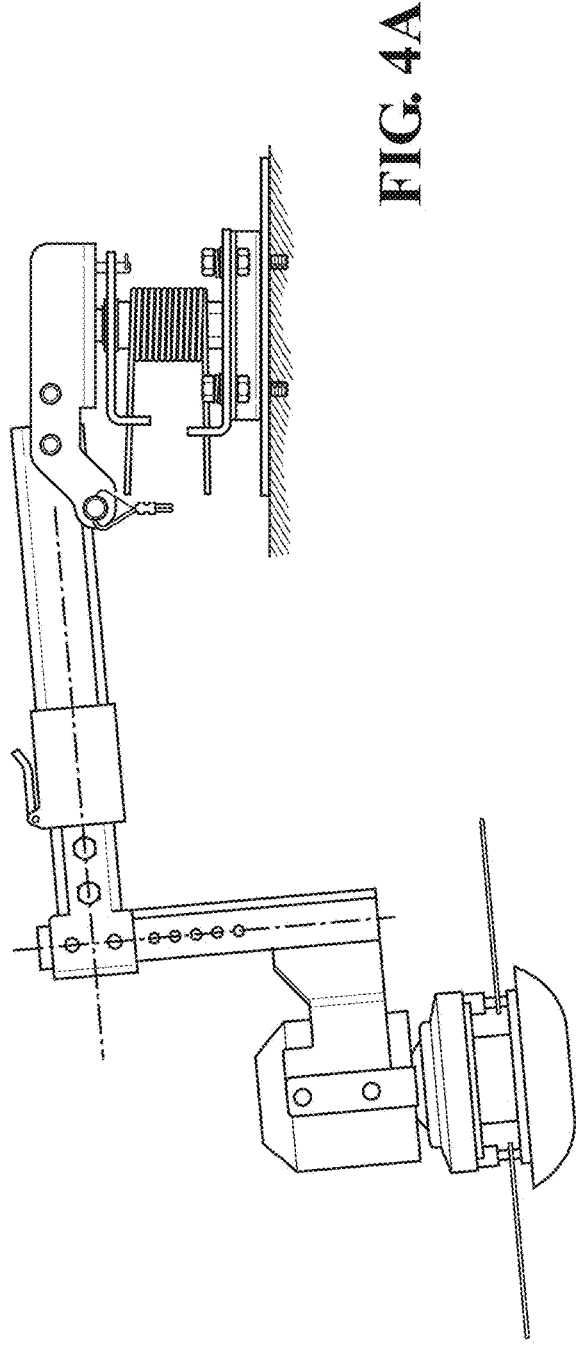
FIG. 4A is a side view of a string trimmer attachment assembly for attachment to a mower deck in a first elevational adjusted position.
Figure 4B:
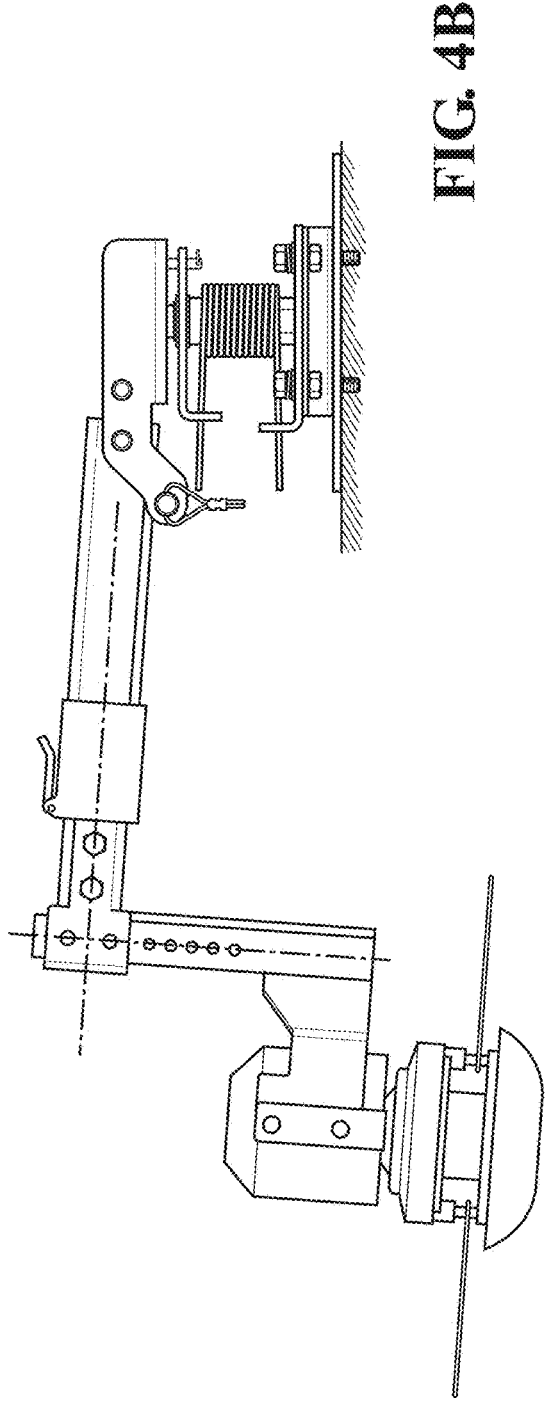
FIG. 4B is a side view of a string trimmer attachment assembly for attachment to a mower deck in a second elevational adjusted position.

In this embodiment, the first arm 50 includes a cam-lock 52 or other locking interface to control a telescopic extension and retraction of an inner first arm portion 50B with respect to an outer first arm portion 50A (FIGS. 1A and 1B). The second arm 60 is adjustable along the second axis Y with respect to the coupling 70 that is mounted to the inner first arm portion 50B (FIGS. 2A and 2B). In this embodiment, the second arm 60 includes numerous apertures 62 along the length of the second arm 60 to receive a pin from the coupling 70 to maintain a desired vertical position. That is, by sliding the inner first arm portion 50B with respect to the outer first arm portion 50A along axis A, and the second arm 60 with respect to the coupling 70 along the second axis Y, the trimmer head 40 is positioned as desired. In one example, the inner first arm portion 50B, the outer first arm portion 50A, and the second arm 60 may be, for example, steel rectangular tubes. The first arm 50 including the outer first arm portion 50A and inner first arm portion 50B, and the second arm 60, may be, for example, rectilinear in cross-section.

Figure 6:
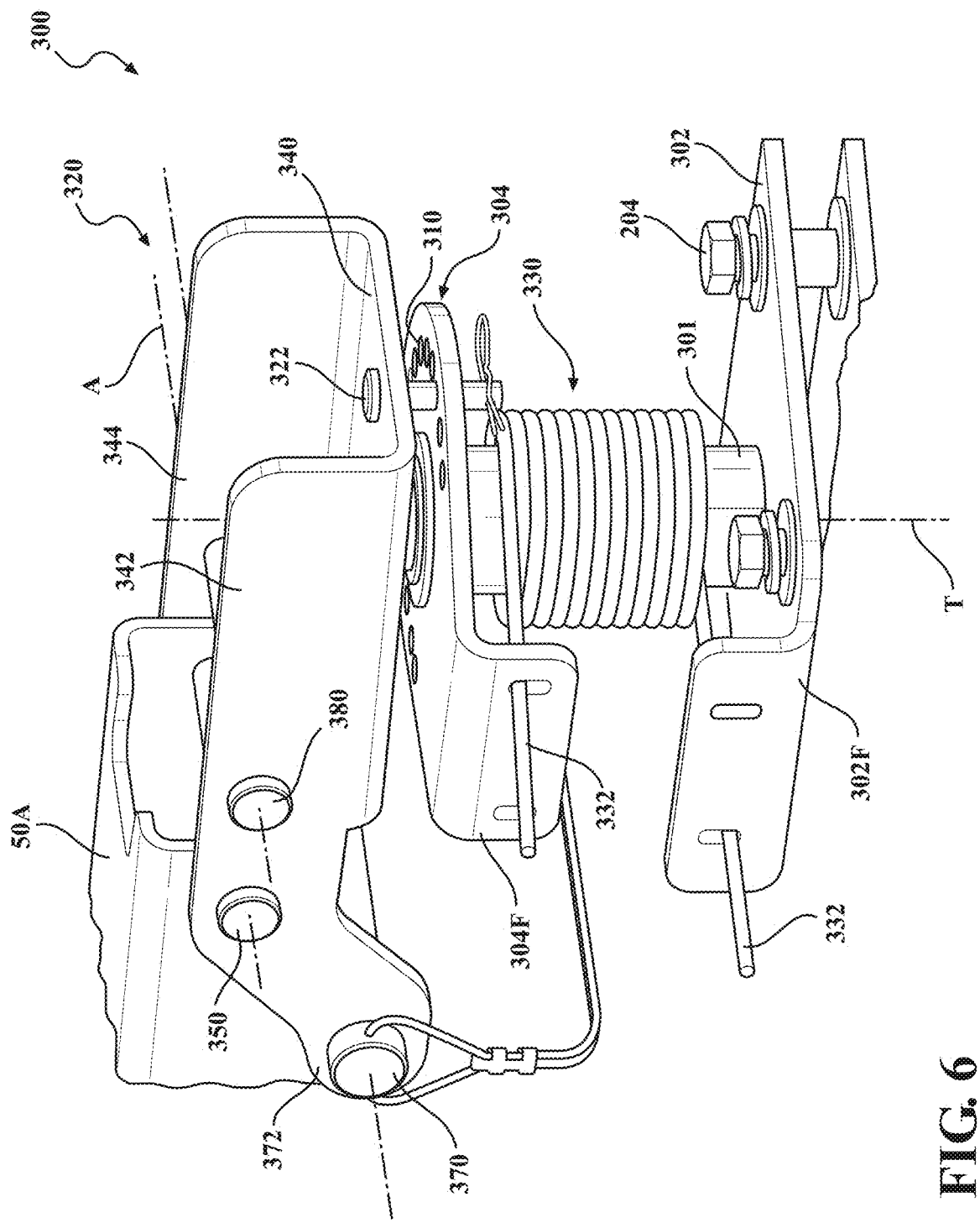
FIG. 6 is a perspective view of a turret of the string trimmer attachment assembly.
Figure 7:
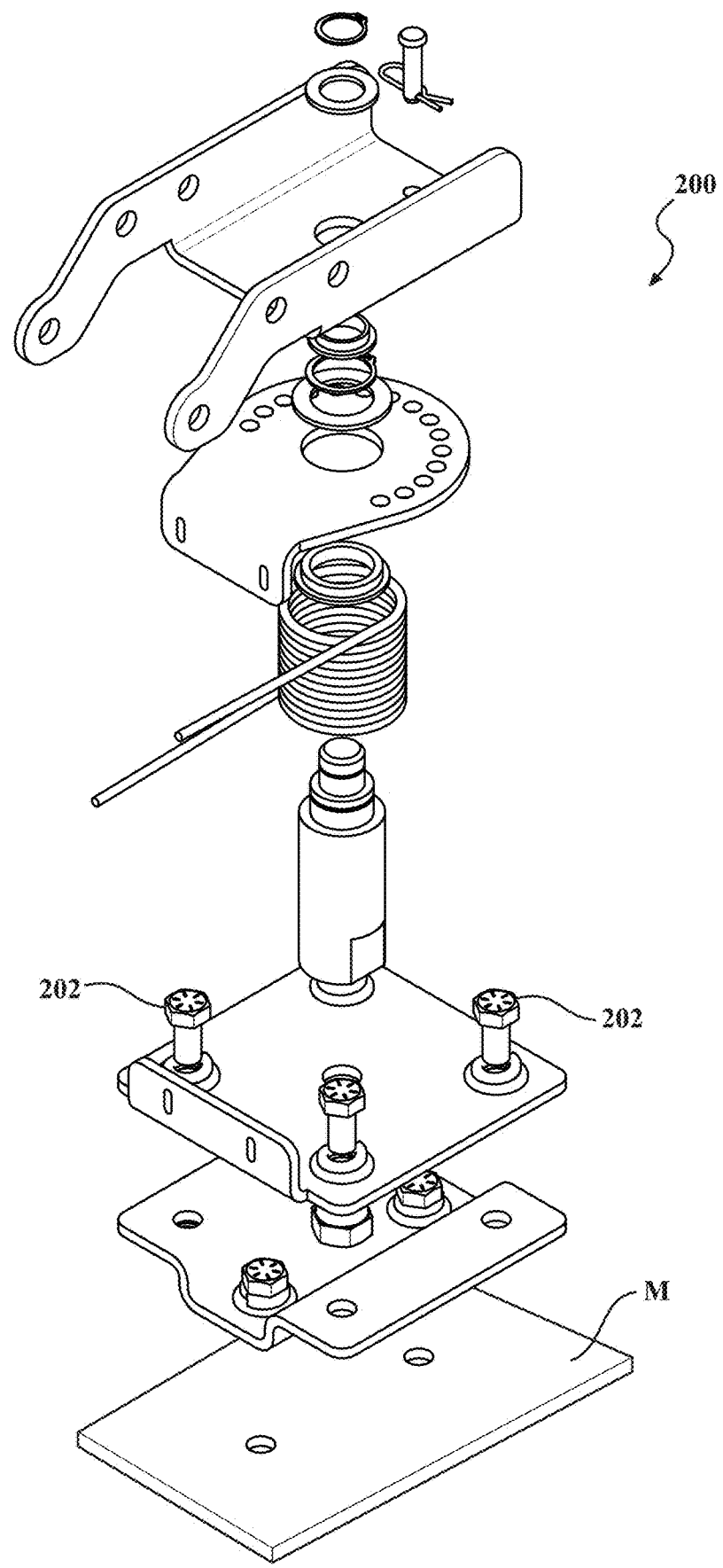
FIG. 7 is an exploded view of a base for the turret of the string trimmer attachment assembly.

With reference to FIG. 6, the base 30 includes a deck attachment mount 200 and a removable turret 300 which allows removal of the entire string trimmer attachment assembly 20 from the mower deck M. The deck attachment mount 200 may include a deck mount plate 202 secured to the mower deck M via fasteners 203 such as bolts (FIG. 7) and a lower turret plate 302 fastened to the deck mount plate 202 via fasteners 204 such as bolts (FIG. 7). The turret 300 and the attached string trimmer attachment assembly 20 is thereby readily removable.

Figure 8:
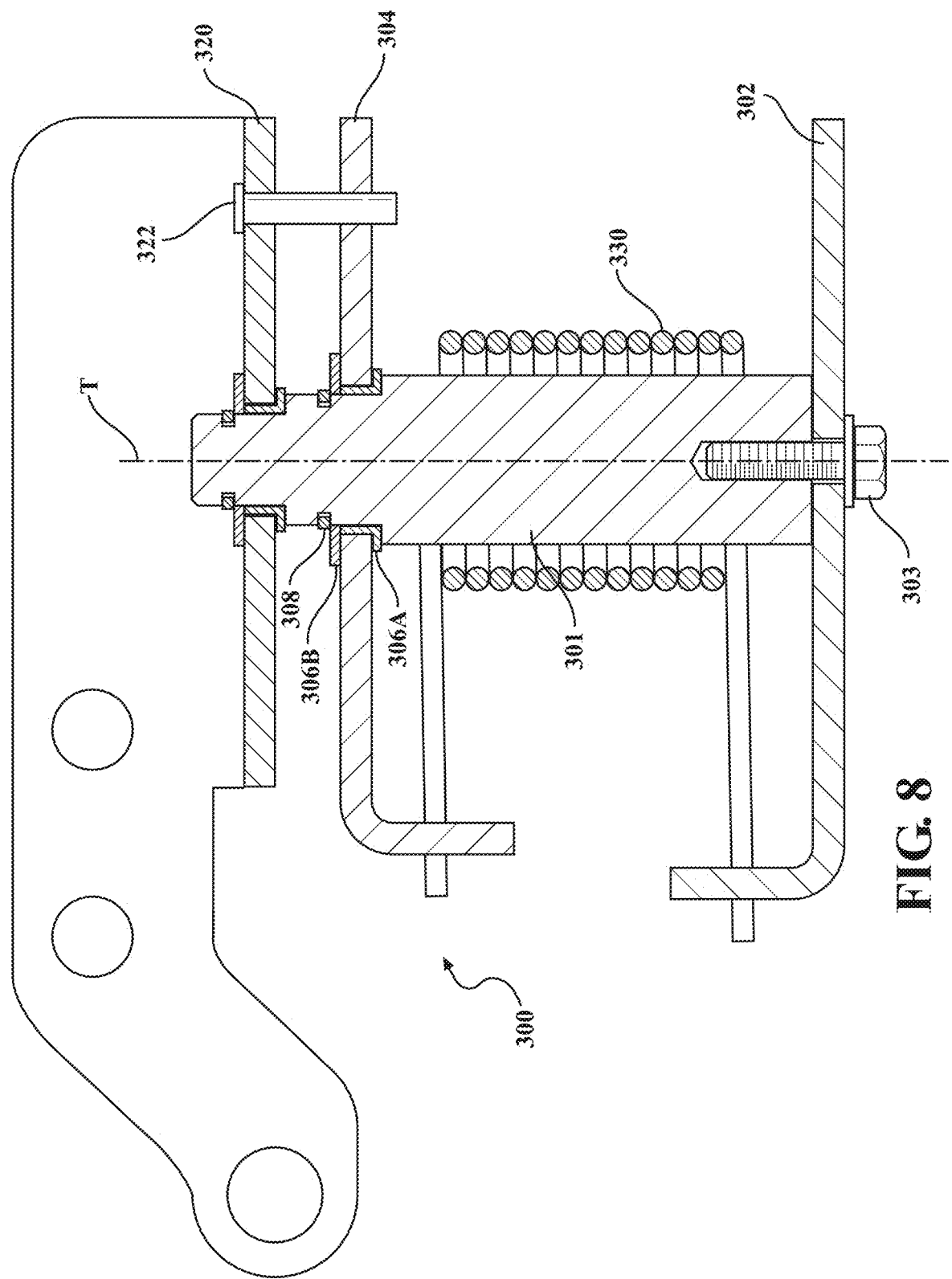
FIG. 8 is a sectional view of the turret of the string trimmer attachment assembly.

The turret 300 generally includes a support pin 301 attached to the lower turret plate 302 via a fastener 303, such as a bolt, along an axis T (also shown in FIG. 8). A middle turret plate 304 is rotationally mounted to the support pin 301 via bushings 306A, 306B and secured thereto with a snap ring 308. In one example, bushing 306A may be a flange bushing and bushing 306B may be a straight bushing.

Figure 9:
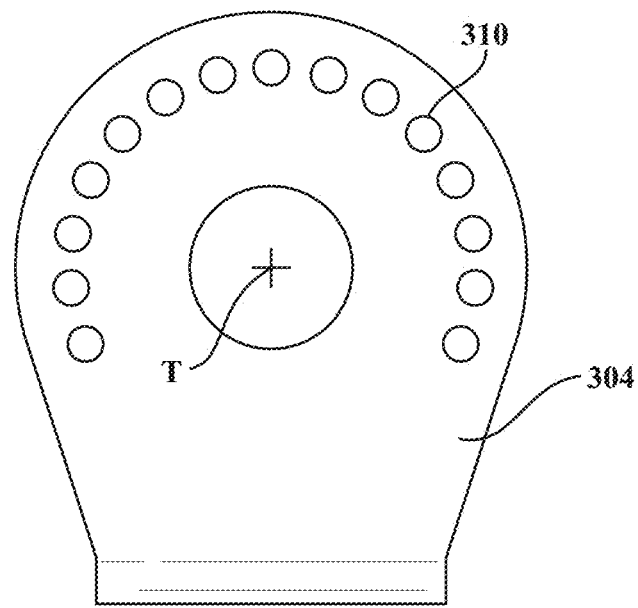
FIG. 9 is a plan view of a middle plate for the turret of the string trimmer attachment assembly.

The middle turret plate 304 includes a multiple of apertures 310 (also shown in FIG. 9) located at least partially around the axis T to permit an upper turret plate 320 to be rotationally affixed thereto via a pin 322 or other removable fastener which extends transverse therebetween to set a desired azimuthal position.

The lower turret plate 302 and the middle turret plate 304 each include a respective flange 302F and 304F which receives legs 332 of a torsion spring 330. The torsion spring 330 provides azimuthal bias about axis T (FIGS. 3A and 3B) to absorb impacts such as, for example, if a user accidently hit a tree or fence.

The upper turret plate 320 may be formed as a generally "U" channel structure with a lower turret plate 340, and side plates 342, 344, that may be formed as a unitary channel support to receive the outer first arm portion 50A and permit articulation relative thereto. The side plates 342, 344 may include apertures 346 to pivotally receive the outer first arm portion 50A via a pin 350 about an axis A. That is, the first arm 50 is pivotable relative to the upper turret plate 320 about axis A.

Figure 10:
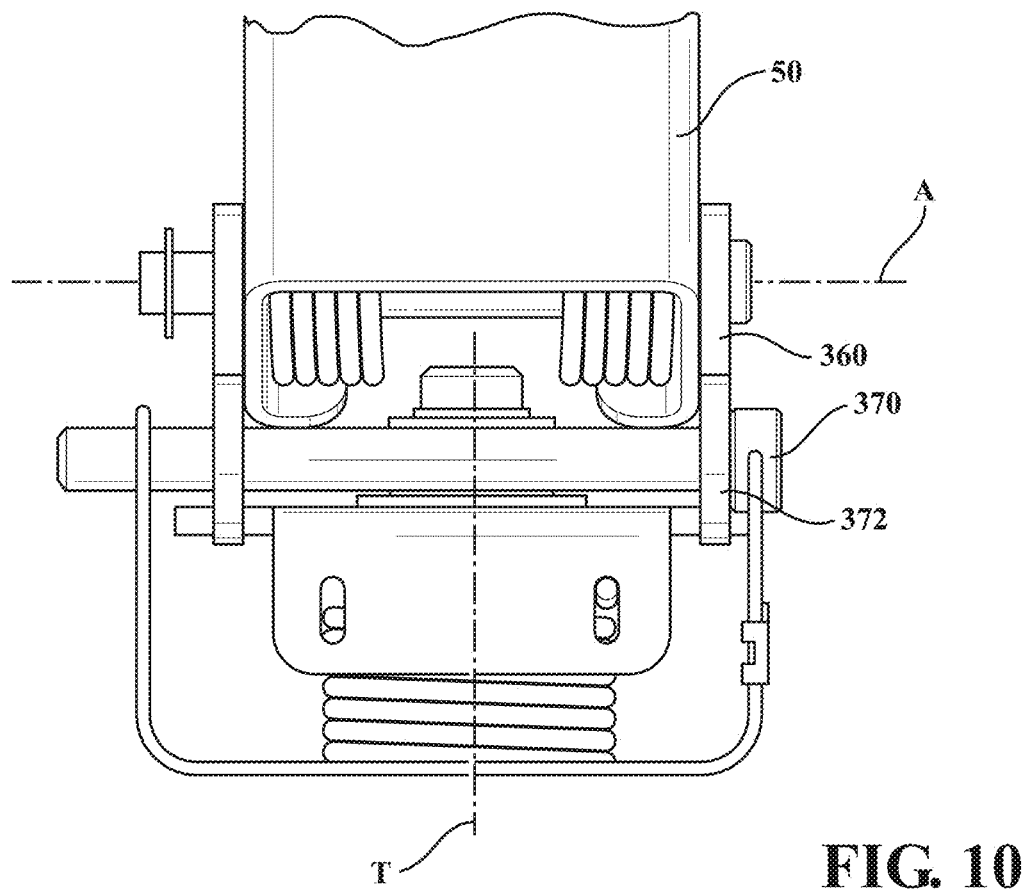
FIG. 10 is a front view of the turret of the string trimmer attachment assembly in a storage position.

A torsion spring 360 (FIG. 10) may be located about the pin 350 (FIG. 11) to bias the first arm 50 away from the ground to at least partially compensate for the weight thereof. A lower stop pin 370 may be positioned through lower stop apertures 372 in the side plates 342, 344 to provide a lower stop for the first arm 50 at a predefined angle about axis A and facilitate the setting of a cutting height. Removal of the lower stop pin 370 allows the torsion spring 360 to bias the trimmer head 40 (FIGS. 4A and 4B) such that the trimmer head 40 thereby "floats" and follows the contours of the ground by the bias force provided by the torsion spring 360.

Figure 11:
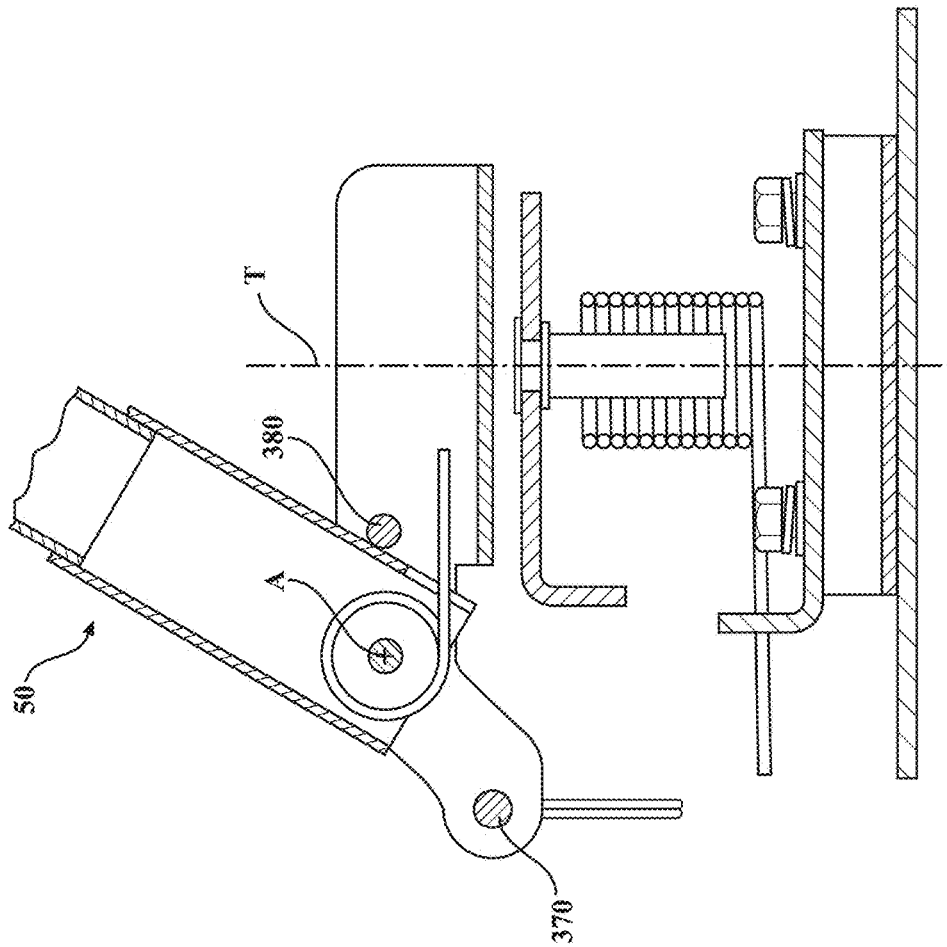
FIG. 11 is a side view of the string trimmer attachment assembly in the storage position.
Figure 12:
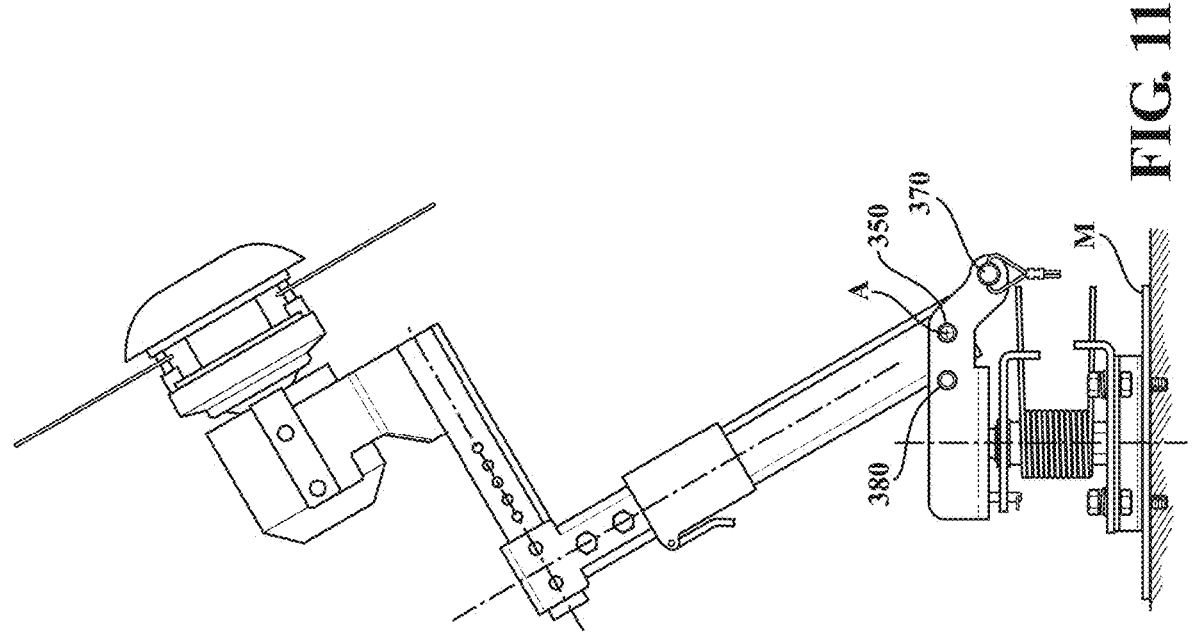
FIG. 12 is a sectional side view of the string trimmer attachment assembly in the storage position.

An upper stop pin 380 may be positioned through upper stop apertures 382 in the side plates 342, 344 to provide a stop for the first arm 50 at a predefined angle about axis A (FIGS. 11 and 12). The upper stop pin 380 provides a storage position for the first arm 50. The storage position may be a position in which the weight of the first arm 50 overcomes the bias of the torsion spring 360. In this embodiment, the limit switch 88 may be mounted to the first arm 50 such that the trimmer head 40 deactivates in response to the first arm 50 being positioned against the upper stop pin 380.

The string trimmer attachment assembly 20 may be adjusted with respect to the cutting path to provide overlap to the cutting path. Alternatively, or in addition, the trimmer head 40 may be pivoted to provide for edging or other cutting paths.

The string trimmer attachment assembly 20 is inherently safe via the spring biases as these safety features work in unison to ensure that the string trimmer attachment assembly 20 will not be damaged if an obstacle is truck and that the trimmer will not continue running in a stored position.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A string trimmer attachment assembly for a lawn mower, comprising:
   a deck attachment mount;
   a turret mounted to the deck attachment mount about a turret axis that extends through the deck attachment mount;
   a trimmer head;
   a first arm mountable to the turret, the first arm comprises an inner first arm portion telescopically adjustable with respect to an outer first arm portion along a first axis, wherein the first arm is positionable in elevation about an elevation axis defined by the turret, the elevation axis offset and transverse from the turret axis, wherein the first arm is movable in elevation between a lower stop and an upper stop defined by the turret, the first arm positionable in azimuth about the turret axis;
   a cam-lock to retain the inner first arm portion with respect to the outer first arm portion along the first axis;
   a torsion spring mounted about the elevation axis to bias the first arm in elevation toward the ground;
   a second arm mountable to the trimmer head, the second arm adjustable along a second axis perpendicular to the first axis; and
   a coupling at an interface between the first arm and the second arm such that the second arm is adjustable along a second axis perpendicular to the first axis.

2. The assembly as recited in claim 1, wherein the deck attachment mount comprises a first plate fastened to a deck of the lawn mower, and a second plate attached to the turret.

3. The assembly as recited in claim 1, wherein the first arm and the second arm are rectilinear in cross-section.

4. The assembly as recited in claim 1, wherein the first arm is positionable in azimuth to any of a multiple of positions about the turret axis.

5. The assembly as recited in claim 4, wherein the first arm is spring biased with respect to a selected one of the multiple of positions.

6. The assembly as recited in claim 1, wherein the first arm is movable in elevation between a lower stop and an upper stop defined by the turret.

7. The assembly as recited in claim 6, wherein the first arm is spring biased in elevation toward the lower stop.

8. The assembly as recited in claim 7, further comprising a limit switch mounted to the first arm, the trimmer head deactivated in response to the first arm being positioned at the upper stop.

9. A turret for a string trimmer attachment assembly, comprising:
   a support pin that defines a turret axis;
   a lower turret plate fastened to the support pin;

a middle turret plate rotationally mounted to the support pin, the middle turret plate comprises a multiple of apertures located at least partially around the turret axis;

an upper turret plate rotationally mounted to the support pin, the upper turret plate comprises side plates;

a pin that extends through the upper turret plate and one of the multiple of apertures in the middle turret plate;

a torsion spring about the support pin, the torsion spring engaged with the middle turret plate and the lower turret plate to spring bias the upper turret plate in azimuth with respect to the lower turret plate about the turret axis.

10. The assembly as recited in claim 9, further comprising a first arm pivotally mounted to the side plates of the upper turret plate such that the first arm is positionable in elevation about an elevation axis.

11. The assembly as recited in claim 10, wherein the first arm is movable in elevation about the elevation axis between a lower stop and an upper stop defined by the upper turret plate.

12. The assembly as recited in claim 11, wherein the first arm is spring biased in elevation toward the lower stop.

13. The assembly as recited in claim 12, further comprising a limit switch mounted to the first arm, a trimmer head deactivated in response to the first arm being positioned at the upper stop.

14. The assembly as recited in claim 9, further comprising a deck mount plate mountable to a mower deck, the lower turret plate removably fastenable to the deck mount plate.

15. The assembly as recited in claim 9, further comprising a lower stop pin positioned through lower stop apertures in the side plates of the upper turret plate to provide the lower stop for the first arm at a predefined angle about the elevation axis to set a cutting height.

16. The assembly as recited in claim 15, further comprising a torsion spring located about a pin that defines the elevation axis to bias the first arm away from the ground to at least partially compensate for the weight thereof.

17. The assembly as recited in claim 16, further comprising an upper stop pin positioned through upper stop apertures in the side plates of the upper turret plate to provide a stop for the first arm at a predefined angle about the elevation axis to provides a storage position for the first arm.

* * * * *